(12) United States Patent
Surakka et al.

(10) Patent No.: US 7,958,129 B2
(45) Date of Patent: Jun. 7, 2011

(54) PROCESSING DATA RECORDS FOR FINDING COUNTERPARTS IN A REFERENCE DATA SET

(75) Inventors: Timo Surakka, Espoo (FI); Pentti Pulkkinen, Espoo (FI)

(73) Assignee: Tieto Oyj, Helsinki (FI)

( * ) Notice: Subject to any disclaimer, the term of this patent is extended or adjusted under 35 U.S.C. 154(b) by 37 days.

(21) Appl. No.: 10/559,386

(22) PCT Filed: Jun. 1, 2004

(86) PCT No.: PCT/FI2004/000331
§ 371 (c)(1),
(2), (4) Date: May 24, 2006

(87) PCT Pub. No.: WO2004/109546
PCT Pub. Date: Dec. 16, 2004

(65) Prior Publication Data
US 2006/0218136 A1 Sep. 28, 2006

(30) Foreign Application Priority Data
Jun. 6, 2003 (FI) .................................... 20030855

(51) Int. Cl.
*G06F 17/30* (2006.01)
(52) U.S. Cl. ........................................ 707/749; 707/758
(58) Field of Classification Search .................. 707/749, 707/758
See application file for complete search history.

(56) References Cited

U.S. PATENT DOCUMENTS

| | | | |
|---|---|---|---|
| 5,210,868 A | 5/1993 | Shimada et al. | |
| 5,220,625 A * | 6/1993 | Hatakeyama et al. | 715/809 |
| 5,519,857 A * | 5/1996 | Kato et al. | 707/5 |
| 5,551,049 A | 8/1996 | Kaplan et al. | |
| 5,572,423 A * | 11/1996 | Church | 715/257 |
| 5,649,221 A | 7/1997 | Crawford et al. | |
| 7,231,343 B1 * | 6/2007 | Treadgold et al. | 704/9 |
| 7,440,941 B1 * | 10/2008 | Borkovsky et al. | 707/5 |

(Continued)

FOREIGN PATENT DOCUMENTS
WO WO 01/41002 A1 6/2001
(Continued)

OTHER PUBLICATIONS

Sa Lin et al., "Integrating a Heterogeneous Distributed Data Environment with a Database Specific Ontology," The International Conference on Parallel and Distributed Computing Systems, 2001, XP-002297454, pp. 430-435.

Sergio Luján-Mora et al., "Reducing Inconsistency in Integrating Data from Different Sources," 1098-8068/01, 2001 IEEE, XP-010554383, pp. 209-218.

(Continued)

*Primary Examiner* — Neveen Abel-Jalil
*Assistant Examiner* — Son T Hoang
(74) *Attorney, Agent, or Firm* — Arent Fox, LLP

(57) ABSTRACT

The present invention relates to a method of processing a data record for finding a counterpart in a reference data set. In the data record a value of a data field is determined, where the data field represents an identifier. At least one synonym candidate for the value of the data field is determined from a set of predetermined identifier values. It is determined if a synonym candidate and the value of the data field fulfill a predetermined synonym acceptance criterion, and if the predetermined synonym acceptance criterion is fulfilled, the value of the data field and the synonym candidate are associated as synonyms. Thereafter a search for a counterpart for the data record is conducted by comparing to entries of the reference data set the value of the data field and/or a synonym associated with the value of the data field.

27 Claims, 8 Drawing Sheets

U.S. PATENT DOCUMENTS

| | | | |
|---|---|---|---|
| 2002/0010639 A1* | 1/2002 | Howey et al. | 705/26 |
| 2002/0010726 A1* | 1/2002 | Rogson | 707/533 |
| 2002/0078024 A1* | 6/2002 | Bellamy et al. | 707/1 |
| 2004/0024760 A1* | 2/2004 | Toner et al. | 707/6 |
| 2004/0064447 A1* | 4/2004 | Simske et al. | 707/5 |
| 2004/0088157 A1* | 5/2004 | Lach et al. | 704/9 |
| 2004/0107205 A1* | 6/2004 | Burdick et al. | 707/102 |
| 2004/0181759 A1* | 9/2004 | Murakami et al. | 715/532 |

FOREIGN PATENT DOCUMENTS

| | | |
|---|---|---|
| WO | WO 03/012679 A1 | 2/2003 |

OTHER PUBLICATIONS

M. Andrea Rodríguez et al., "A Knowledge-Based Approach to Querying Heterogeneous Databases," Lecture Notes in Computer Science vol. 2366, 2002, XP-002297455, pp. 213-222.

\* cited by examiner

| match_street | match_street_clean | street | postal code | city code |
|---|---|---|---|---|
| Hietaniemenk | Hietaniemenk | Hietaniemenkatu | 00100 | 091 |
| Hietaniemenkatu | Hietaniemenkatu | Hietaniemenkatu | 00100 | 091 |
| Hietaranta | Hietaranta | Hietaranta | 00100 | 091 |
| Hietart | Hietart | Hietaranta | 00100 | 091 |
| Ilmarig | Ilmarig | Ilmarigatan | 00100 | 091 |
| Ilmarigatan | Ilmarigatan | Ilmarigatan | 00100 | 091 |
| Ilmarink | Ilmarink | Ilmarinkatu | 00100 | 091 |
| Ilmarinkatu | Ilmarinkatu | Ilmarinkatu | 00100 | 091 |
| ItäinenTeaterikj | ItäinenTeaterikj | ItäinenTeatterikuja | 00100 | 091 |
| ItäinenTeaterikuja | ItäinenTeaterikuja | ItäinenTeatterikuja | 00100 | 091 |
| Jakonk | Jakonk | Jaakonkatu | 00100 | 091 |
| Jakonkatu | Jakonkatu | Jaakonkatu | 00100 | 091 |
| Jakobsg | Jakobsg | Jakobsgatan | 00100 | 091 |
| Jakobsgatan | Jakobsgatan | Jakobsgatan | 00100 | 091 |

| data field value | synonym |
|---|---|
| 63TUOHELA<br>Ahojantie<br>AITIONTIE<br>Alalanantie<br>ANINGINKUJA<br>ARAPIANPOLKU<br>BAKAKSENTIE | 664Tuomela<br>Ahonojantie<br>Aitoontie<br>Alarannantie<br>Aninkuja<br>Arabianpolku<br>Baggaksentie |

Fig. 6

|  aux | L | A | K | S | E | O | T | I | E |
|---|---|---|---|---|---|---|---|---|---|
| aux | 0 | 1 | 2 | 3 | 4 | 5 | 6 | 7 | 8 | 9 |
| L | 1 | 0 | 1 | 2 | 3 | 4 | 5 | 6 | 7 | 8 |
| A | 2 | 1 | 0 | 1 | 2 | 3 | 4 | 5 | 6 | 7 |
| A | 3 | 2 | 1 | 1 | 2 | 3 | 4 | 5 | 6 | 7 |
| K | 4 | 3 | 2 | 1 | 2 | 3 | 4 | 5 | 6 | 7 |
| S | 5 | 4 | 3 | 2 | 1 | 2 | 3 | 4 | 5 | 6 |
| O | 6 | 5 | 4 | 3 | 2 | 2 | 2 | 3 | 4 | 5 |
| T | 7 | 6 | 5 | 4 | 3 | 3 | 3 | 2 | 3 | 4 |
| I | 8 | 7 | 6 | 5 | 4 | 4 | 4 | 3 | 2 | 3 |
| E | 9 | 8 | 7 | 6 | 5 | 4 | 5 | 4 | 3 | 2 |

700

|  aux | J | A | C | O | B | S | E | N |
|---|---|---|---|---|---|---|---|---|
| aux | 0 | 1 | 2 | 3 | 4 | 5 | 6 | 7 | 8 |
| J | 1 | 0 | 1 | 2 | 3 | 4 | 5 | 6 | 7 |
| A | 2 | 1 | 0 | 1 | 2 | 3 | 4 | 5 | 6 |
| C | 3 | 2 | 1 | 0 | 1 | 2 | 3 | 4 | 5 |
| O | 4 | 3 | 2 | 1 | 0 | 1 | 2 | 3 | 4 |
| B | 5 | 4 | 3 | 2 | 1 | 0 | 1 | 2 | 3 |
| S | 6 | 5 | 4 | 3 | 2 | 1 | 0 | 1 | 2 |
| S | 7 | 6 | 5 | 4 | 3 | 2 | 1 | 1 | 2 |
| O | 8 | 7 | 6 | 5 | 4 | 3 | 2 | 2 | 2 |
| N | 9 | 8 | 7 | 6 | 5 | 4 | 3 | 3 | 2 |

| Round | | | result | |
|---|---|---|---|---|
| 1 | A | Aleksis Kiven Katu | 1 | |
| 2 | K | leksis Kiven Katu | 1 | |
| 3 | i | sis Kiven Katu | 1 | |
| 4 | v | s Kiven Katu | 1 | 800 |
| 5 | K | en Katu | 1 | |
| 6 | a | atu | 1 | |
| 7 | t | tu | 1 | |
| 8 | u | u | 1 | |

| Round | | | result | |
|---|---|---|---|---|
| 1 | A | Ainontie | 1 | |
| 2 | i | inontie | 1 | |
| 3 | n | nontie | 1 | |
| 4 | o | ontie | 1 | |
| 5 | n | ntie | 1 | 810 |
| 6 | k | tie | 0 | |
| 7 | a | tie | 0 | |
| 8 | t | tie | 1 | |
| 9 | u | ie | 0 | |

Fig. 8

PROCESSING DATA RECORDS FOR FINDING COUNTERPARTS IN A REFERENCE DATA SET

CROSS-REFERENCE TO RELATED APPLICATION

This application is a National Stage entry of International Application Number PCT/FI2004/000331, filed Jun. 1, 2004. The disclosure of the prior application is hereby incorporated herein in its entirety by reference.

FIELD OF THE INVENTION

The present invention relates in general to processing data records, which may contain information such as names or other denominations written in varying ways, for finding counterpart for these data records in a reference data set. The present invention relates in particular to finding a counterpart to a data record by using a synonym set representing known variations for the identifier values.

BACKGROUND OF THE INVENTION

In many languages, certain names that sound similar are written differently. There may be, for example, some common ways to write certain first or last names. Regarding street names or names for other geographical entities, there are often official ways to write these names and various ways to abbreviate them. Furthermore, spelling errors or other intentional errors may cause further variation to written names.

In many data processing applications data records are compared to a reference data set, for finding counterparts in the reference data set for the data records. For example, new customer information may need to be checked against existing customer information or against information obtained from official data registers.

When a counterpart search is carried out for a data record, slight variations in writing names, other identifiers or in general any strings present in the data record should be tolerable, otherwise counterparts are found only for those data records that are written exactly like entries in the reference data set. For as many data records as possible a counterpart should be found, but the found counterparts should be correct. It is important to avoid finding incorrect counterparts, as in such a case two customers, for example, might become mixed up. The more intelligent the search for counterparts, the more it typically requires processing capacity. A counterpart search should allow enough variations for finding likely counterparts, but still avoid false counterparts to be found.

In customer information applications, for example, the search for counterparts is generally done automatically, and the data records for which a counterpart is not found, may be manually processed. It is therefore desirable to minimize the amount of data records for which counterparts cannot be found. Finding counterparts fast and reliably is a demanding task especially when large quantities of information are processed.

There are various methods for searching for counterparts in a reference data set for data records to be processed. One method that may be used is based on full text index, where the measure for similarity is the number of identical strings or separate characters in a piece of information to be processed and in an entry in a reference data set. Basic full text indexing does not take into account the order in which the similar characters appear in the data record and in the entries in the reference data set. Basic full text indexing is also insensitive to the logic context in which the identical strings or characters appear in the data record and in the entries in the reference data set. Generally full text indexing is more applicable for finding a set of possible counterparts than for evaluating whether a possible counterpart is a valid counterpart for a certain data record.

Another method for searching for counterparts is based on dividing a data record to data fields representing certain identifiers. Using customer information as an example, the identifiers may contain a first name, a family name and a street name, and both the information to be processed and the information in the reference data set are divided into data fields similarly. Then these data fields of the data records to be processed and the ones of the reference data set entries are compared with each other. It is possible to use field-specific criteria for determining a match for the fields. This makes the search for counterparts more reliable, but may require more processing resources. For establishing a match for a data field, typically the data field value of a given data record needs to form at least a substring of the data field value of an entry in the reference data set.

In a method where the data records are divided into data fields, an entry in the reference data set may be given points for each data field that matches a data field in a given data records, when a counterpart is searched for the given data record. For an entry in the reference data set to be accepted as a counterpart, the entry typically needs to obtain a total number of points higher than a certain threshold. Alternatively or additionally, other criteria may be specified for accepting an entry as a counterpart. The threshold and possible other criteria usually are determined based on earlier experience on processing similar information or by making test runs.

As mentioned above, the requirement for finding a match between a data field in a data record to be processed and a data field in an entry of the reference data set may be quite strict. Therefore, when determining matches for the data fields, reference sets and/or synonym sets are often used. A reference set in this specification means a data structure listing predetermined values for an identifier. These predetermined values in general represent various correct ways of writing a name or other identifier. A synonym set in this specification means a data structure listing already known variations for identifier values. These variations typically include common spelling mistakes. An entry in the synonym set typically refers to an entry in the reference set, for linking the synonym set entry to a respective value for the identifier. Regarding street names, for example, a reference set would contain different official ways of writing and/or abbreviating street names, whereas a synonym set would contain unofficial ways of writing street names or their abbreviations, or slightly erroneously written (but still recognizable) street names.

For a match to be established for a data field in a data record to be processed, the content of the data field typically needs to be identical to or form a substring of the content of a data field in either an entry in the reference set or an entry in the synonym set. It is possible that a data field of a certain data record has no match in the reference or synonym sets. For example, a street name maybe written erroneously in such a way that the synonym set has no entry containing this variation of the street name. In such a case it depends on the points (or other evaluation results) of the entries in the reference data set whether matches relating to the other data fields are enough for finding a counterpart for the data record containing the erroneously written street name.

The reference sets are usually updated periodically, for example, weekly to incorporate new street names. Updating reference sets is often straightforward, as this information may typically be received from official sources. The synonym sets are usually updated less frequently. This updating is generally done by manually going through data records, for which a counterpart has not been found in earlier conducted searches. For data field values, which are recognizable, entries to the synonym set may be made. It is, however, possible that errors occur in updating the synonym set manually. The criteria for entering a certain variation of an identifier may also depend on the person responsible for the update. Regarding street names, for example, it is possible that a street name referring to a street in one city is added erroneously to the synonym set as a street name referring to a street in another city. There are also various other possibilities for errors during a manual update.

As mentioned above, finding counterparts reliably for data records to be processed depends on the contents of the reference sets and synonym sets.

It is an aim of embodiments of the present invention to address the problems of finding counterparts in a fast and reliable way. The relating problems have been discussed above.

BRIEF SUMMARY OF TEE INVENTION

According to a first aspect of the present invention there is provided a method of processing a data record for finding a counterpart in a reference data set, the method comprising the steps of:
 determining in the data record a value of a data field, the data field representing an identifier,
 determining from a set of predetermined identifier values at least one synonym candidate for the value of the data field,
 determining if a synonym candidate and the value of the data field fulfill a predetermined synonym acceptance criterion, and if the predetermined synonym acceptance criterion is fulfilled, associating the value of the data field and the synonym candidate as synonyms, and
 searching for a counterpart for the data record by comparing to entries of the reference data set the value of the data field and/or a synonym associated with the value of the data field.

According to a second aspect of the invention, there is provided a method of processing a synonym set for searching counterparts in a reference data set for data records, a data record containing a data field representing an identifier, members of the synonym set being first identifier values and referring to respective second identifier values, the second identifier values being predetermined identifier values, and said searching for a counterpart involving comparison of a value of the data field to the synonym set, the method comprising the steps of determining among the predetermined identifier values at least one synonym candidate relating to the value of the data field in the data record, and, if the value of the data field and a synonym candidate fulfill a predetermined synonym acceptance criterion, adding before searching a counterpart for a data record the value of the data field to the synonym set as a member referring to the synonym candidate.

According to a third aspect of the invention, there is provided a computer program comprising program instructions for causing a computer to perform the method of any one of the appended method claims.

According to a fourth aspect of the invention, there is provided a computer program embodied on a computer-readable record medium.

According to a fifth aspect of the invention, there is provided a data processing system for processing data records for finding counterparts in a reference data set, the system comprising:
 means for receiving data records,
 means for storing the reference data set,
 means for storing predetermined identifier values for an identifier,
 means for determining in the data records values of a data field, the data field representing the identifier,
 means for associating values of the data field and respective predetermined identifier values as synonyms, said means configured to determine from the predetermined identifier values at least one synonym candidate for a value of the data field, to determine if a synonym candidate and the value of the data field fulfill a predetermined synonym acceptance criterion, and if the predetermined synonym acceptance criterion is fulfilled, to associate the value of the data field and the synonym candidate as synonyms, and
 means for searching counterparts in the reference data set for the data records, said searching involving comparing to entries of the reference data set values of data fields and/or synonyms associated with the values of the data fields.

According to a sixth aspect of the invention, there is provided a data processing system for processing a synonym set for searching counterparts in a reference data set for data records, a data record comprising a data field representing an identifier, members of the synonym set being first identifier values and referring to respective second identifier values, said second identifier values being predetermined identifier values, and said searching involving comparing a value of the data field to the synonym set, the system comprising:
 means for storing the synonym set,
 means for storing predetermined identifier values for the identifier,
 means for receiving data records,
 means for determining in the data records values of the data field, and
 means for adding to the synonym set a value of the data field and respective predetermined identifier values associated as synonyms before searching counterparts in the reference data set, said means configured to determine from the predetermined identifier values at least one synonym candidate for a value of the data field, to determine if a synonym candidate and the value of the data field fulfill a predetermined synonym acceptance criterion, and if the predetermined synonym acceptance criterion is fulfilled, to associate the value of the data field and the synonym candidate as synonyms.

In some embodiments of the invention, a synonym set is updated dynamically. In these embodiments, the synonym set update is part of the process for finding counterparts to data records to be processed, and it is carried out automatically depending on a predetermined synonym acceptance criterion. If the predetermined synonym acceptance criterion is fulfilled, a data field value forming a part of the current data record to be processed is added to a synonym set. By defining a suitable synonym acceptance criterion, it is possible to control the accuracy of finding counterparts in a reference data set. It is also possible to avoid errors relating to manually updating a synonym set. The synonym acceptance criterion may be determined, for example, by test runs on a known set of data records.

The synonyms may be stored and used for processing further data records or, alternatively, the synonym(s) associated with a data field value of a specific data record may be used for that specific data record only. In some embodiments of the invention, synonyms are determined for each data record on the fly. This means that even if two or more data records contain a same non-predetermined value for a specific data field, the same procedure for associating a synonym with this data field value is carried out for each of these data records.

BRIEF DESCRIPTION OF THE DRAWINGS

For a better understanding of the present invention and as how the same may be carried into effect, reference will now be made by way of example only to the accompanying drawings in which:

FIG. 5 shows, as an example, a reference table relating to street names;

FIG. 6 shows, as an example, a synonym table relating to street names;

FIG. 7 shows two examples of calculating Levenshtein distances; and

FIG. 8 shows examples relating to calculating proportions of identical characters.

DETAILED DESCRIPTION OF THE PREFERRED EMBODIMENTS OF THE INVENTION

Figure 1:
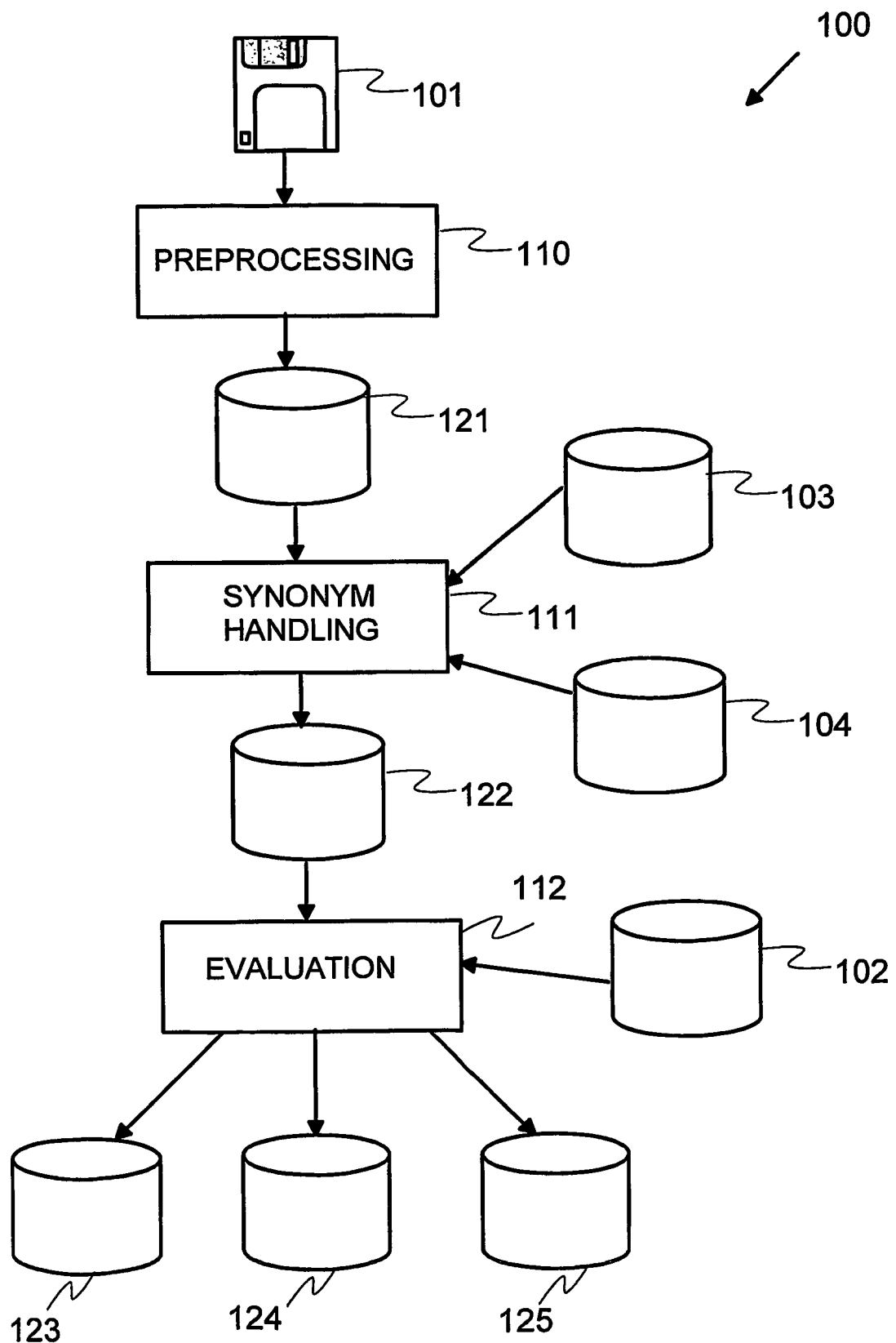
FIG. 1 shows, as an example, schematically an overview of a method where embodiments of the invention are applicable.

FIG. 1 shows, as an example, schematically an overview of a method where embodiments of the invention are applicable. In FIG. 1 the data records 101 to be processed are shown to be stored on a diskette. The reference data set 102, in which the counterparts are to be searched for, is shown in FIG. 1 as a database. The reference set 103 and the synonym set 104 relating to a specific identifier, for example to a street name, are shown to be stored in databases. In processing large quantities of information, the reference data set, the reference sets and the synonym sets are usually stored in databases.

It is appreciated that although FIG. 1 shows the reference set 103 and the synonym set 104 only for one specific identifier, synonym handling may be performed for many identifiers. In such cases many reference sets and synonym sets are involved in processing received data records. It is possible that these various reference and synonym sets are stored in a single database. The reference and synonym sets are often handled as tables, but they may be any other suitable data structures. The synonym set and the reference set may be stored in a memory of a computer or in a more permanent data storage.

The received information 101 is first preprocessed in step 110. This preprocessing refers to determining in the data records to be processed at least one data field representing an identifier. The received information may contain data field separators or otherwise indicate the data field. Alternatively, the preprocessing may involve division of a character string into a suitable number of data field. Typically the data records to be processed are divided into a number of data fields, each data field representing an identifier. The preprocessing may also include some modification of the data field values in accordance with some predetermined rules. For example, when data fields representing names are processed, it may be advisable to convert the character strings into a format where double consonants are replaced with single consonants. See FIG. 5 for an example of replacing double consonants and vowels with single consonants and vowels. Such predetermined rules typically depend on the relevant language. Entries in a reference data set 102 have typically been preprocessed similarly.

The data records 101 to be processed typically contain some data fields, which are not present in the entries of the reference data set. In the customer information example, customer identifiers may be such information. The counterparts may be searched for by using all those data fields that are present both in the data records 101 to be processed and in the entries in the reference data set 102, or using only some of those common data fields.

The preprocessed data records are stored as a file (or database) 121. The synonym handling in step 111 uses a reference set 103 and a synonym set 104 for converting those values of the identifier data field(s) to predetermined identifier values. For example, if a street name is abbreviated in an official way, the abbreviation may be converted to the official street name with the help of the reference set 103. As a second example, if the street name in the data record to be processed is a common variation, it may be converted to the official street name with the help of the synonym set 104. Typically the identifier value present in the reference set is added to a further data field in the data record. The information stored in the file 122 thus usually contains both the original value of the data field and a corresponding official identifier value, when that value can be found using the reference set and/or the synonym set. It may of course happen that, for example, for a new variation of a street name it is not possible to find the corresponding official street name.

In step 112, entries of the reference data set are evaluated, for example, by giving points for each data field for which is a match between the data record to be processed and the entry in the reference data set. The amount of points for a match may be different for different data fields. One way to decide the number of points for each data field for a match is to make test runs. Typically matches of the most relevant data field are given more weight in this evaluation step and matches of less relevant data fields.

This evaluation in step 112 typically involves all those data fields based on which the counterparts are searched for. For accepting an entry in the reference data set as a counterpart for a data record to be processed, the points (or other evaluation result) of the entry typically need to exceed a certain threshold. There may alternatively or additionally be some other criteria that an entry should fulfil. For example, the content of a certain data field may need to be correct. The threshold and possible other criteria are usually determined based on earlier experience on processing similar information or by making test runs.

For a given data record to be processed, no counterpart, one counterpart or multiple counterparts may be found. This is shown in FIG. 1 by the following three files: no counterparts 123, one counterpart 124 and multiple counterparts 125. The file 123 relating to non-identified data records typically contains the original data records. The files 124 and 125 typically contain such data records, where the original contents of the data fields have been replaced by respective contents of data fields of reference data set entries. Any additional original information, which is not used in searching for counterparts, is typically present in the files 124 and 125.

As an example, the data records to be processed may be customer data records containing customer numbers, first names, last names, and addresses. Counterparts in the reference data set may be searched using name and address information. The files 124 and 125 in this example contain first names, last names and addresses written in the same way as in the counterpart entries in the reference data set and the original customer numbers.

Multiple counterparts may relate, for example, to a data record, where only a first letter of a first name is given, and there are many entries in the reference data set where the first name starts with this letter and other data fields are also sufficiently similar to the other data fields of the data record to be processed.

Figure 2:
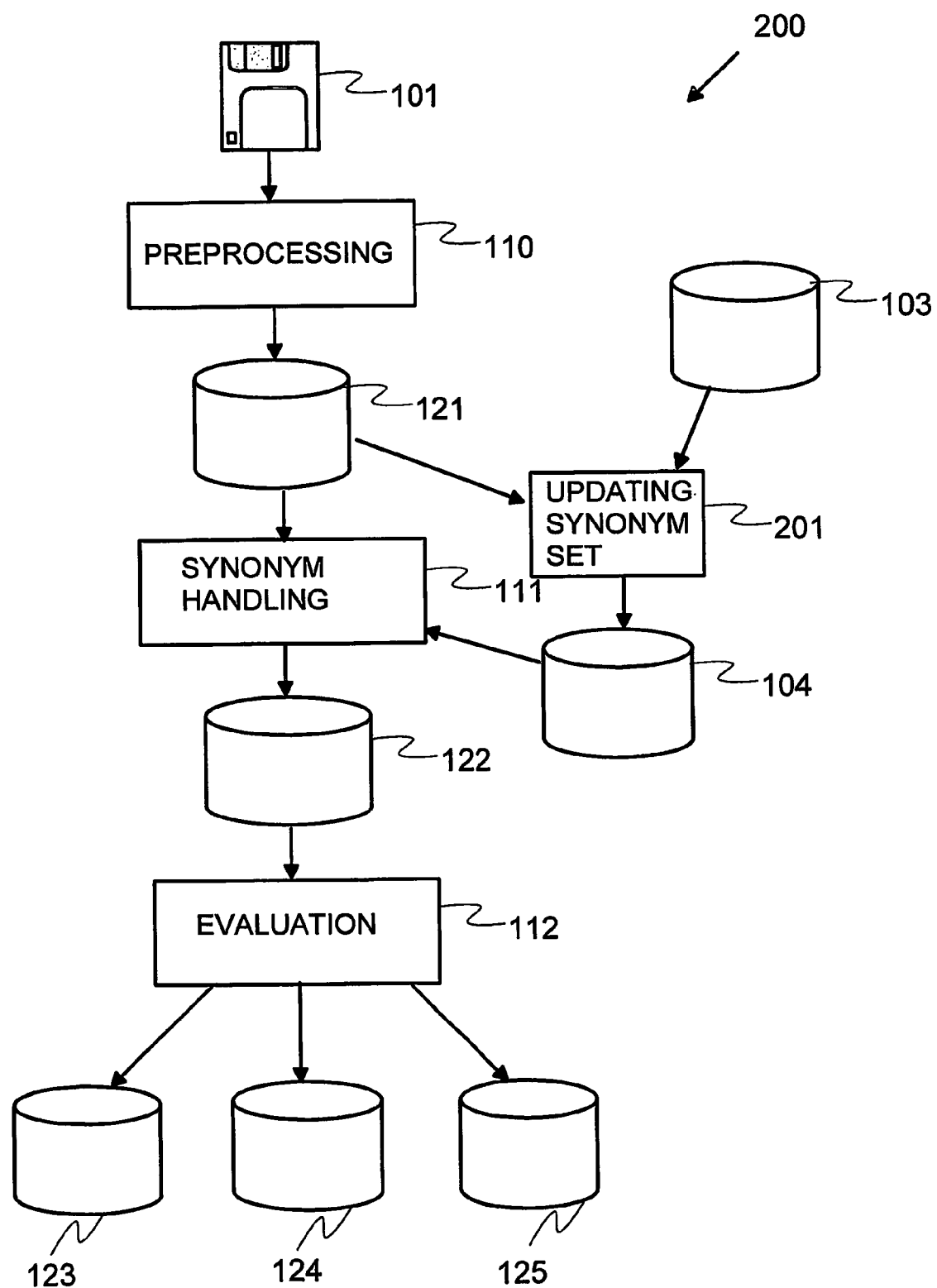
FIG. 2 shows, as an example, schematically an overview of a method involving an embodiment of the invention.

FIG. 2 shows, as an example, schematically an overview of a method 200 involving an embodiment of the invention. In the method, the synonym set 104 is updated in step 201 using information in the present set of data records to be processed and information in the reference set 103. As shown in FIG. 2 as an example, the synonym set update is usually carried out using the preprocessed data records in the file 121.

In step 201 an identifier value, which is suitable to be a synonym candidate for the value of a data field in a data record to be processed, is first determined from the predetermined identifier values. Typically synonym candidates are determined using the reference set 103 where the predetermined identifier values are stored, as illustrated in FIG. 2. The synonym candidates are typically determined using predefined rules. If the value of the data field and the synonym candidate fulfill a synonym acceptance criterion, the synonym set 104 may then be updated by adding thereto an entry, which contains the value of the data field and refers to the synonym candidate, that is to one of the identifier values in the reference set 103. Alternatively, the synonym may be associated with the data field value by, for example, placing the synonym to a further data field in the relevant data record.

The other method steps and temporary files relating to the method 200 are similar to those relating to the method 100 in FIG. 1.

The method illustrated in FIG. 2 is typically run as a batch job. This means that step 110 is first carried out for a certain set of data records to be processed. Thereafter synonyms are associated with the data field values of the data records in step 201 and stored in a data structure, for example in a synonym table. Typically an entry to the synonym table relating to one data record is made before starting to process another a next data record, but it is also possible to first associate synonyms with all relevant data field values in the set of data records, and then add these to the synonym table. After the synonym table has been updated with at least some of the data field values present in the set of data records, the synonym handling step 111 is carried out for all data records belonging to the present set.

It should be noted that when starting to analyse a set of data records, the synonym set 104 may either already contain at least one entry or it may be empty. It is thus possible to update an existing synonym set in step 201 or to create a new synonym set in step 201.

It is possible to associate synonyms for all values of a data field in a set of the data records, but typically a data field value is first compared to the entries in the reference set 103 and to the entries in the synonym set 104. If the data field value is already in the reference set 103 or in the synonym set 104, it need not be added to the synonym set. On the other hand, depending on the implementation, it may be more resource consuming to compare a data field value to the reference set and/or to the synonym set than to straightforwardly proceed to associating a synonym with the data field value. Especially in some databases the index may be set to automatically ignore duplicate entries to the database. In such a case the synonym set would not contain duplicate entries even if synonyms were associated with each data field value without comparing them to the synonym set.

It is appreciated that in some embodiments of the invention, the data records are not processed as batch jobs. The data records may be processed on a record-by-record basis, for example, by carrying out steps 110, 201, 111 and 112 for a first data record, and then for a second data record and so on. In these embodiments of the invention, where data records are processed record-by-record, the synonym set may be stored in a data structure and updated in step 201. Alternatively, it is possible that there is no specific separate data structure for storing a synonym set. For example, a synonym associated with a data field value of a data record may be used only for that specific data record, and the associated synonym may be stored only to that data record. It is alternatively possible that the associated synonym is kept in a memory during processing of a data record, without storing the synonym to the data record.

Figure 3:
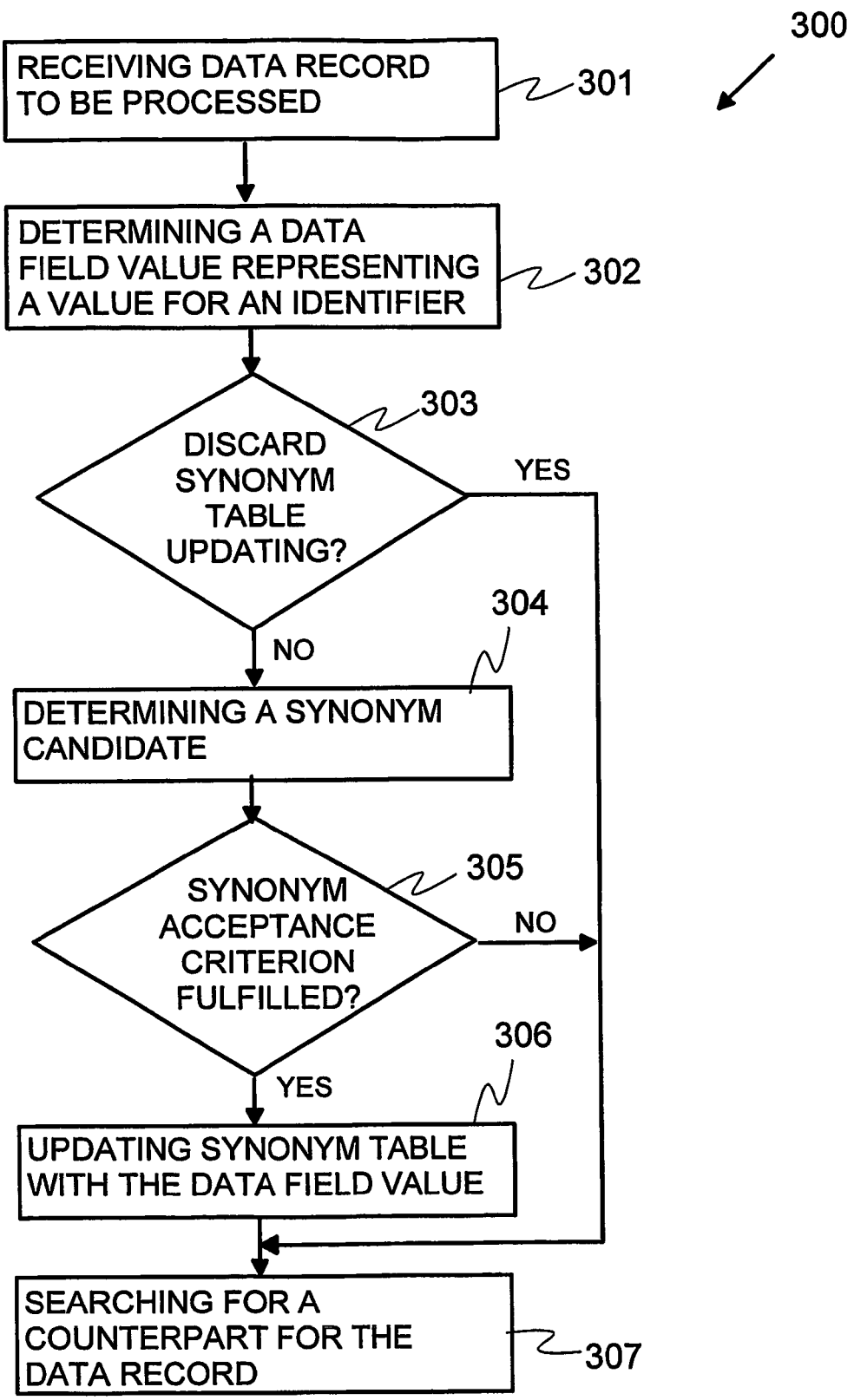
FIG. 3 shows, as an example, a flowchart of a method in accordance with a first embodiment of the invention.

FIG. 3 shows, as an example, a flowchart of a method 300 in accordance with a first embodiment of the invention. In this embodiment the synonym and reference set are stored in tables. Some of the steps in method 300 correspond to the steps in method 200. A data record to be processed is received in step 301. In step 302, a data field value representing a value for a certain identifier is determined.

In step 303 it is checked whether updating a synonym table is to be discarded for a data field value of the current data record. Typical reasons for discarding updating a synonym table in embodiments of the invention are that the data field value of the current data record is already present in a reference table relating to the identifier and/or in a synonym table relating to the identifier. In some cases there may be need for some further checks involving at least one other data field of the current data record. This depends also on the contents of the reference table or that of the synonym table. For example, for a street name the reference table and/or the synonym table may contain further information indicating a geographical area. This further information may be, for example, a name of a city, a number code of a city, or a postal code. In this street name example, if the street name and a postal code in the data record to be processed are the same as in an entry in the reference table, it is unnecessary to update the synonym table for a street name. It is appreciated that such further information need not be present in both the reference table and in the synonym table, as the entries in the synonym table refer to entries in the reference table. See below for an example of the contents of a reference table and a synonym table.

If updating the synonym table is to be discarded, the method continues in step 307, where a counterpart for the data record to be processed is searched using the synonym table. It is appreciated that step 303 prevents, for example, duplicating entries of the reference table to the synonym table and thus makes processing of the synonym table less resource consuming. Step 303, however, may not always be necessary in the embodiments of the invention, as discussed above.

If updating the synonym table is to be considered, a synonym candidate among predetermined identifier values (typically stored in a reference table) for the data field value is determined in step 304. In step 305 it is checked whether the data field value and the synonym candidate fulfill a synonym acceptance criterion. Determining synonym candidates—that is identifier values, to which the data field value likely corresponds to—is discussed in more detail below in connection with a second embodiment of the invention. If the synonym acceptance criterion is fulfilled, the data field value referring to the synonym candidate is added to the synonym table for the identifier in step 306. Thereafter the method 300 continues in step 307, and the updated synonym table is used in searching for a counterpart for the current data record. If the synonym acceptance criterion is not fulfilled, the method 300 continues directly in step 307 without updating the synonym table.

It is appreciated that although the first embodiment is described above in connection with a data field value of current data record, it is possible to update the synonym table to contain entries for all relevant data field values of a certain set of data records before starting the search for counterparts of these data records. It is also possible that the accepted synonyms are associated with the data field values by, for example, placing the synonyms in further data field in the respective data records or by keeping the associated synonyms in a memory until the data record has been processed.

Figure 4:
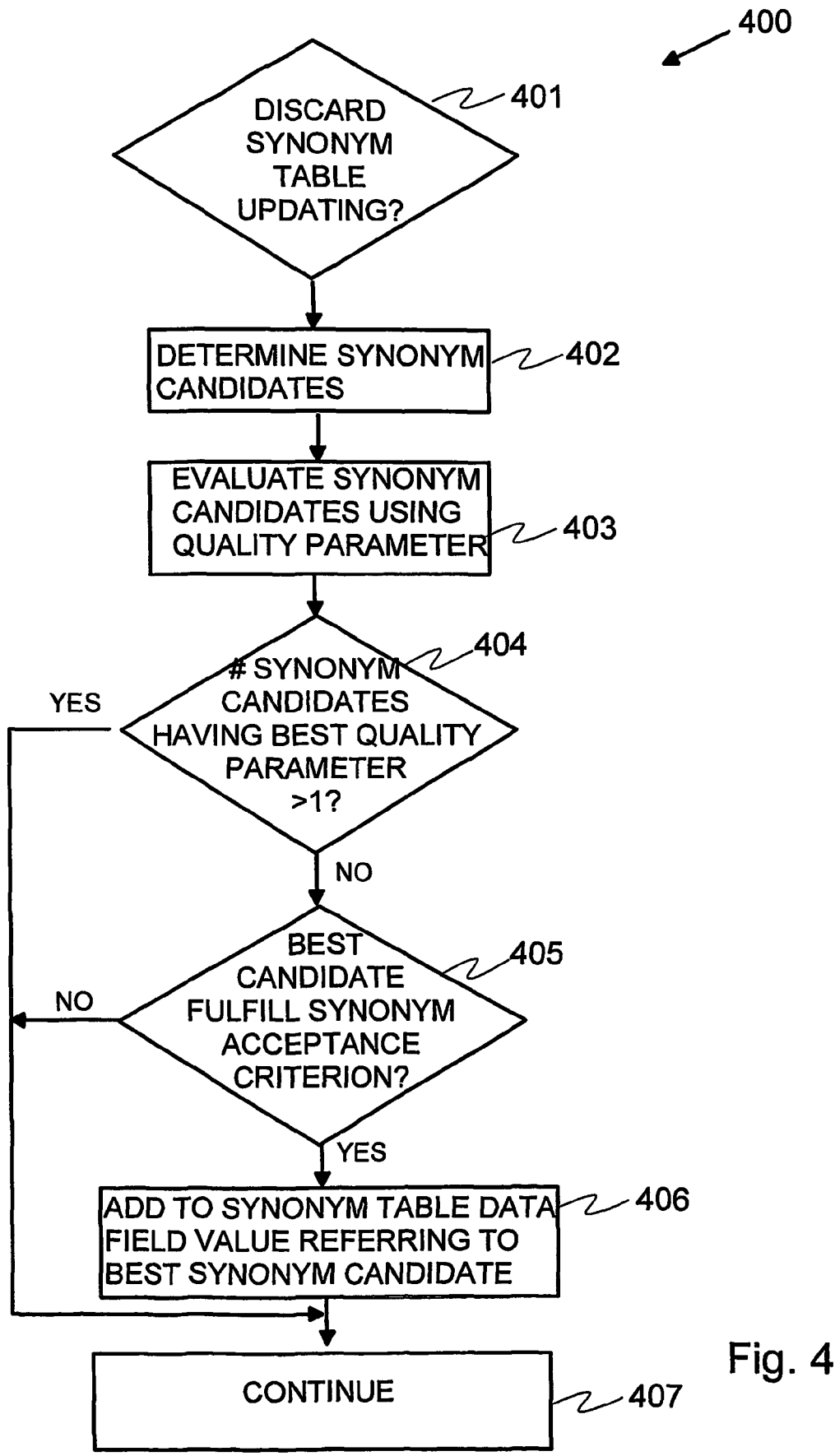
FIG. 4 shows, as an example, a part of a flowchart of a method in accordance with a second embodiment of the invention.

FIG. 4 shows, as an example, a part of a flowchart of a method 400 in accordance with a second embodiment of the invention. The step 401 of the method 400 corresponds to the step 303 of the method 300 in FIG. 3, but gives a more specific example of the discard criterion. The steps 402-405 of method 400 give a more detailed example of determining a synonym candidate for the data field value (step 304) and of the synonym acceptance criterion in step 305.

In step 401, it is first checked whether the data field value in question is found in an entry in the reference table or in the synonym table. It may be additionally checked that a second data field in the data record to be studied, said second data field representing a second identifier, is identical to or resembles corresponding information in the entry in the reference table or in the synonym table.

As an example, street names and reference/synonym tables containing information about street names and relating postal codes are considered. FIGS. 5 and 6 illustrate, as examples, a reference table 500 and a synonym table 600 relating to street names in Finnish and Swedish. The reference table 500 contains the following columns: match_street column contains official ways of writing or abbreviating a street name; match_street_clean column contains preprocessed official names (in FIG. 5 the preprocessing includes replacing double consonants and vowels by single ones); street column contains the official street name; postal code column contains the postal code of the area, where the street is located; and city code contains a code for the city, where the street is located. The synonym table 600 contains the following columns: data field value and synonym. The data field value contains some non-official versions of street names, and the synonym column contains the corresponding official street name. The synonym column in the synonym table 600 corresponds to the street column in the reference table 500. It should be noted that the examples illustrated in FIGS. 5 and 6 form only part of a realistic reference and synonym tables. In realistic applications there typically are much more entries in a synonym table and in a reference table.

The synonym table update may be discarded for a street name, if the street name and postal code are found in a reference table or if the street name is found in the synonym table and at least the most relevant part, for example the beginning, of a postal code is identical with that in the current piece of information. In this example, the additional check relating to the postal code enables synonym table update in those cases, where streets in more than one postal code areas have identical names. As the entries in the synonym table are by default not correct ways of writing a street name—unlike the entries in the reference table—the further checking criterion relating to the synonym table may be less strict that that for the reference table.

If the synonym table update is to be considered, a synonym candidate among the predetermined identifier values needs to be determined for the data field value. The synonym candidate is determined using entries of the reference table, in other words using various correct values for the identifier. It is also possible that many synonym candidates will be determined to relate to a specific data field value.

In step 402 the reference table entries (that is, the synonym candidates), which are considered in determining a synonym for the data field value, are selected using a candidate selection criterion. This step thus restricts the number of reference table entries taken into account in determining the synonym for the data field value. The candidate selection criterion typically involves the data field value and an entry in the reference table. Additionally, a further data field of the data record to be processed may be involved in the candidate selection criterion. The further data field may be a second data field representing a second identifier.

Consider again the street name as an example for the identifier. Consider that the reference table for a street name contains also information about the geographic area, for example a postal code. An example of a candidate selection criterion is the following: either 1) the postal codes and the first letters of the street name are identical in the data record to be processed and in the reference table entry or 2) the postal codes are identical, the first letter in the street names is different and the third, fourth and fifth letter in the street names are identical in the data record to be processed and in the reference table entry. It is appreciated that the details of the candidate selection criterion may depend at least on the language and/or the meaning of the identifier. A suitable candidate selection criterion may be found, for example, by test runs.

Another example of a candidate selection criterion takes into account how similar the data field value and an identifier value in a reference table entry sound. Such a candidate selection criterion may be used in connection with various names. Soundex codes are examples of measures of how similar two words sound. One example of a suitable soundex code for use in a candidate selection criterion is the commonly used, original soundex code, which consists of the first letter of the name followed by three digits determined using known rules. An advantage of using soundex codes is that many databases are provided with this functionality. A further example of a candidate selection criterion is to use full text index sensitive to separate characters.

In step 403 the identifier value candidates are evaluated by calculating at least one quality parameter. In this second embodiment of the invention one quality parameter relates to the number of changes N required for converting the data field value to be identical to a synonym candidate. The number of changes may be calculated by means of any appropriate technique, for example as a Levenshtein distance. Levenshtein is a known method for calculating the minimum number of changes required for converting a first character string to a second character string.

FIG. 7 shows two examples for calculating the Levenshtein distance. Table 700 illustrates calculating the minimum number of changes for converting word LAKSEOTIE (target) to word LAAKSOTE (source). Table 710 illustrates calculating the minimum number of changes for converting word JACOBSEN (target) to word JACOBSSON (source).

The Levenshtein distance may be calculated using a matrix, where the number of columns is the number of characters in the source and the number of rows is the number of characters in the target. For calculating the topmost row and the leftmost column of the matrix, an auxiliary row and an auxiliary column are needed. The auxiliary row and column contain integers from zero onwards. The values for the entries in the matrix are calculated by selecting the smallest one of the following three values: 1) value of the entry on the left plus 1; 2) value of the entry above plus one; and 3) value of the entry on the up left entry plus A, where A=0, when the characters are the same and otherwise A=1. The Levenshtein distance is the entry in the right-most entry in the bottom row. The Levenshtein distance for converting word LAKSEOTIE to word LAAKSOTIE is 2, and the Levenshtein distance for converting word JACOBSEN to word JACOBSSON is also 2.

A further example of a quality parameter is the proportion of identical characters in the value of the data field and in a synonym candidate. This quality parameter takes into account the order of identical characters in the data field value and in the synonym candidate.

One possibility to measure the proportion of identical characters in the data field value and in the synonym candidate is the following. Consider an example, where the data field value is "A Kiv katu" and a synonym candidate is "Aleksis Kiven kata". First the data field value and the synonym candidate are compared forwards, starting from the beginning. FIG. 8 illustrates this example in table 800. In the first round, the first character of the data field value is searched for starting form the beginning of the synonym candidate. In this example, the letter A is found, as the synonym candidate begins with this letter. In the second round, the second character of the data field value is searched for, but starting in the synonym candidate from the character succeeding the character found in a previous round. This way each character of the data field value is searched in the synonym candidate. As can be seen in Table 800, each character of "A Kiv katu" is found in "Aleksis Kiven katu" and in the same order. This forward comparison thus results in a value of 1. Table 810 illustrates a second example: there the data field value is "Ainonkatu" and the synonym candidate is "Ainontie". For this second example, the forward comparison results seven out of nine, that is about 0.78.

This way to study the proportion of identical characters may be sensitive to the difference between the length of the data field value and the length of the synonym candidate. Therefore it is advisable to compare the data field value and the synonym candidate backwards and forwards, four times altogether. As an illustrative example, strings "ABC" and "DEF" would be compared in the following ways: ABC vs DEF; CBA vs. FED; DEF vs. ABC; and FED vs. CBA. Of the results of these four comparisons, the largest result is the value for the quality parameter.

Regarding the examples of Tables 800 and 810, the results of the four comparisons are for Table 800 1, 1, 7/16 and 8/16 and for Table 810 7/9, 2/9, 6/8 and 2/8. The quality parameter measuring the proportion of identical characters and taking into account the order of the characters would thus be 1 for the example illustrated in Table 800 and 7/9 for the example illustrated Table 810.

It is possible to calculate a further quality parameter for all synonym candidates or only for such synonym candidates that have a sufficiently good already calculated quality parameter(s). This is again an implementation choice: it may be faster to calculate further quality parameters for all synonym candidates, or it may be faster to decide based on already evaluated quality parameters whether to calculate further parameters. If the synonym acceptance criterion specifies, for example, independent thresholds for each quality parameter, then further quality parameters may be calculated only for those synonym candidates that are accepted based on the threshold. On the other hand, if the results of the synonym acceptance criterion depend jointly on the quality parameter values, there may be need to evaluate all relevant quality parameters for all synonym candidates.

If independent thresholds or other acceptance rules are used for the quality parameter values, then the order in which the quality parameters are compared to these thresholds typically affects which synonym candidates (if any) are accepted as synonyms. For example, using Levenshtein distance and the proportion of identical characters as quality parameters, the accepted synonyms may be different if the synonym acceptance criterion rules out first those synonym candidates, which do not have the smallest Levenshtein distance, or if it rules first out those synonym candidates, which do not have the largest proportion of identical characters. This needs to be taken into account when defining a synonym acceptance criterion. The thresholds mentioned above are relative, as they compare the best synonym candidates (in the sense of a certain quality parameter) to other synonym candidates. Furthermore, in addition or alternatively to these relative thresholds, it is possible to define absolute thresholds for the synonym candidates. An example of an absolute threshold is that the difference between the length of the synonym candidate and the length of the data field value should not exceed a certain number.

In the second embodiment of the invention, the Levenshtein distance and the proportion of identical characters are used as quality parameters. The synonym acceptance criterion in this second embodiment of the invention specifies that only synonym candidates having the smallest Levenshtein distance values may be accepted as synonyms. As discussed above, it is possible alternatively to have a synonym acceptance criterion, which, for example, specifies that only those synonym candidates, which have the largest proportions of identical characters, may be accepted as synonyms. In the second embodiment of the invention, the best synonym candidates are those, which are associated with smallest N. It is possible that there is one synonym candidate having the smallest N, or more than one synonym candidate may be associated with the smallest N. In step 404 this may be optionally checked. In some cases it may be advisable not to update the synonym table (or otherwise associate a synonym candidate with a data field value), if there are more than one synonym candidates relating to the smallest N. In other cases, the reliability of finding counterparts is not affected by adding to the synonym table a data field value referring to, say, two synonym candidates, which are associated with equal N. What is said here about step 404 applies also to other quality parameters, not only to the Levenshtein distance.

In the second embodiment of the invention, the proportion of the identical characters may be calculated only for those synonym candidates, which have the smallest Levenshtein distance, as the synonym acceptance criterion specifies that only the synonym candidates having the smallest Levenshtein distance may be accepted. In step 405 it is checked whether the synonym candidate(s) having the smallest Levenshtein distance otherwise fulfils the synonym acceptance criterion. In the second embodiment of the invention, the synonym acceptance criterion specifies that the proportion of identical characters for the best identifier value candidate(s) needs to exceed a certain threshold. The threshold is typically about 0.80, but it should be noted that even small changes in the threshold value may cause big changes in the accuracy of finding counterparts. If the threshold is too low, the reliability of the counterparts may worsen clearly. Furthermore, the threshold relating to the proportion of identical characters for accepting a synonym candidate may take into account the length difference of the data field value and of the synonym candidate. Additionally, the updating criterion may specify that the length difference may not be greater than a predefined threshold.

In step 406 the data field value referring to the best synonym candidate(s) is added to the synonym table (or otherwise associated with the data field value), if the synonym acceptance criterion in step 405 is fulfilled. Thereafter the method continues in step 407. This step may involve searching a counterpart for the current data record (record-by-record processing; step 307) or defining a synonym for a next data record (batch job processing; step 303 onwards).

It is possible to further refine the synonym acceptance criterion by defining further quality parameters. Furthermore, as discussed above, it is possible to check for each synonym candidate, whether it fulfils the synonym acceptance criterion. It is thus possible not to have any separate checks relating to a specific quality parameter for ruling out part of the synonym candidates.

It is appreciated that, in addition to the number of changes required to convert one character string to another character string and to the proportion of identical characters in the synonym candidate and a data field value, further quality parameters may be applicable for evaluating the synonym candidates. These quality parameters seem very good choices for identifiers that represent names or other words of a natural language. It is also appreciated that it may be possible to develop a single quality parameter which takes into account, for example, both the number of changes required to convert one character string to another character string and the proportion of identical characters in the character strings or even more quantities. Such a quality parameter may be, for example, a weighted sum of the quantities. Suitable combinations of the individual quantities may be found by testing.

It is furthermore possible to refine the acceptance of synonym candidates with a rejection set, which contains known, undesired synonym values for a certain data field value. The comparison to the rejection set may be done, for example, when determining synonym candidates (in step 304 or 402) or it may be a part of the acceptance criterion (in step 305 or 405).

By updating the synonym table dynamically or by otherwise associating synonyms for the data field values of data records to be processed before searching for counterparts for the data records, it is possible to reduce the number of data records for which counterparts are not found. In the embodiments of the invention, a synonym candidate for a value of a data field is typically determined using predetermined rules, so by defining the predetermined rules suitably it is possible to control the accuracy of finding counterparts. As a comparative example relating to customer information, the percentage of finding counterparts for data records belonging to an exemplary set of customer information was increased from about 70% to about 80% when an existing synonym table was updated dynamically in accordance with the second embodiment of the invention.

It is appreciated that a method in accordance with an embodiment of the invention may be implemented, for example, using standard computing and data processing systems equipped with suitable software. It is quite straightforward to implement the embodiments of the invention especially in existing systems using synonym tables, as only the synonym table update procedure needs to be added. The synonym candidate selection criterion and the synonym acceptance criterion need to be defined with care so that the accuracy of finding counterparts for data records is on a desired level.

It is appreciated that although the above description refers to a reference table and a synonym table for an identifier, corresponding information may be stored in a single data structure. The names reference table and synonym table are meant to be illustrative, and they are not meant to restrict the scope of the invention to data structures having these names. Nor are these names meant to restrict data structures for storing various identifier values for this specific purpose solely to tables.

It is also appreciated that in the detailed embodiments of the invention, a street name is used as a specific example of an identifier. The invention is also applicable to other identifiers, such as geographical identifiers, first names or family names. Furthermore, the invention is applicable to any other denominations, strings or words written in varying ways.

It is furthermore appreciated that term data record in this description and in the appended claims refers to a piece of information to be processed. The context of the information may be different from the examples described above. The invention is thus applicable to processing other pieces of information than just customer information.

It is appreciated that synonym sets relating to more than one identifier may be updated in accordance with the above discussed principles. The invention is not restricted to dynamically updating a synonym set relating to a single identifier.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method of checking input customer information against existing information, the method comprising tolerating writing variations in input data by the steps of:
   determining in an input customer data record a value of a data field, the data field representing an identifier,
   determining, by a processor, from a reference data set of predetermined identifier values in a computer readable database at least one synonym candidate for the value of the data field using a candidate selection criterion,
   determining if a synonym candidate of the determined at least one synonym candidate and the value of the data field fulfill a predetermined synonym acceptance criterion based on at least one quality parameter, wherein said at least one quality parameter takes into account writing variations that are evaluated based on differences in the value of the data field and the synonym candidate, and when the predetermined synonym acceptance criterion is fulfilled, associating the value of the data field and the synonym candidate as synonyms and automatically updating a synonym set representing known writing variations for the identifier in a computer readable database and referencing to respective entries in the reference data set by adding the value of the data field to the synonym set as a member referring to the accepted synonym candidate in the reference data set without intervention of a user before searching for a counterpart for the input customer data record, and
   checking the input customer data record by searching for the counterpart for the input customer data record in the reference data set by comparing the value of the data field to the updated synonym set in the computer readable database after the step of determining if the predetermined synonym acceptance criterion is fulfilled.

2. A method as defined in claim 1, wherein the at least one synonym candidate is determined using a candidate selection criterion depending at least on the value of the data field and on a synonym candidate.

3. A method as defined in claim 2, wherein, the candidate selection criterion takes into account how similar a synonym candidate and the value of the data field sound.

4. A method as defined in claim 2, wherein the candidate selection criterion specifies that at least a predetermined part of the value of the data field is identical to a predetermined part of a synonym candidate.

5. A method as defined in claim 2, wherein the candidate selection criterion takes into account also a further data field of the data record, said further data field representing a second identifier.

6. A method as defined in claim 1, wherein at least one quality parameter takes into account at least one of the following quantities:
a number of changes required for converting the value of the data field to be identical to a synonym candidate; a proportion of identical characters in the value of the data field and in a synonym candidate; and a difference between the length of the value of the data field and the length of a synonym candidate.

7. A method as defined in claim 6, wherein the number of changes required for converting the value of the data field to be identical to a synonym candidate is calculated using the Levenshtein distance.

8. A method as defined in claim 6, wherein the proportion of identical characters takes into account the order of the characters.

9. A method as defined in claim 1, wherein a first quality parameter is evaluated for each synonym candidate and at least a second quality parameter is evaluated at least for the synonym candidate(s) having the best first quality parameter.

10. A method as defined in claim 1, wherein the synonym acceptance criterion requires that there is only one synonym candidate having the best at least one quality parameter.

11. A method as defined in claim 1, wherein at least two quality parameters are evaluated for each synonym candidate and the synonym candidate acceptance criterion specifies a threshold for one of the at least two quality parameters, the threshold being dependent on a further one of the at least two quality parameters.

12. A method as defined in claim 1, wherein determining the at least one synonym candidate is discarded, if a predetermined discard criterion is fulfilled.

13. A method as defined in claim 12, wherein the predetermined discard criterion specifies that the value of the data field is identical to one of the predetermined identifier values.

14. A method as defined in claim 12, wherein the search for the counterpart involves the synonym set and the predetermined discard criterion specifies that the value of the data field is at least one of the following: one of the predetermined identifier values, and a member of the synonym set.

15. A method as defined in claim 12, wherein the predetermined discard criterion takes into account a value of a second data field in the data record.

16. A method as defined in claim 1, wherein information indicating the at least one synonym associated with the value of the data field is added to the data record.

17. A method as defined in claim 16, wherein a copy of the data record is made for each synonym associated with the value of the data field.

18. A method as defined in claim 1, wherein the identifier relates to a name of one of the following: a geographical entity, a person and an organization.

19. A method of updating a synonym set stored in a computer readable database to tolerate writing variation in input data when the synonym set is used in checking an input customer data record against a reference data set representing existing information in a computer readable database, wherein the input customer data record contains a data field representing an identifier, and members of the synonym set are first identifier values referring to respective second identifier values, the second identifier values being predetermined identifier values in the reference data set, the method of updating the synonym set when checking the input customer data record against the reference data set comprising the steps of:
determining, by a processor, among the predetermined identifier values in the reference data set at least one synonym candidate relating to the value of the data field in the input customer data record using a candidate detection criterion,
determining if the value of the data field and a synonym candidate of the at least one synonym candidate fulfill a predetermined synonym acceptance criterion based on at least one quality parameter, wherein said at least one quality parameter takes into account writing variations that are evaluated based on differences in the value of the data field and the synonym candidate, and
when the predetermined synonym acceptance criterion is fulfilled, automatically adding the value of the data field to the synonym set in the computer readable database as a member referring to the accepted synonym candidate in the reference data set without intervention of a user and before the synonym set is used in the checking of the input customer data record against the reference data set by searching for a counterpart for the input customer data record from the synonym set.

20. A method as defined in claim 19, wherein the synonym set is empty before adding the value of the data field to the synonym set.

21. A method as defined in claim 19, wherein the synonym set contains at least one member before adding the value of the data field to the synonym set.

22. A computer-readable record medium having stored thereon computer-executable instructions for causing a computer to perform a method for tolerating writing variations in input data when checking an input customer data record against existing information, the method comprising the steps of:
determining in the input customer data record a value of a data field, the data field representing an identifier,
determining from a reference data set of predetermined identifier values in a computer readable database at least one synonym candidate for the value of the data field,
determining if a synonym candidate of the determined at least one synonym candidate and the value of the data field fulfill a predetermined synonym acceptance criterion based on at least one quality parameter, wherein said at least one quality parameter takes into account writing variations that are evaluated based on differences in the value of the data field and the synonym candidate, and when the predetermined synonym acceptance criterion is fulfilled, associating the value of the data field and the synonym candidate as synonyms and automatically updating a synonym set representing known writing variations for the identifier and referencing to respective entries in the reference data set by adding the value of the data field to the synonym set as a member referring to the accepted synonym candidate in the reference data set without intervention of a user before searching for a counterpart for the input customer data record, and checking the input customer record by searching for a counterpart for the input customer data record in the reference data set by comparing the value of the data field to the updated synonym set after the step of determining if the predetermined synonym acceptance criterion is fulfilled.

23. A computer-readable record medium having stored thereon computer-executable instructions for causing a computer to perform a method for updating a synonym set to tolerate writing variation in input data when the synonym set is used in checking an input customer data record against a reference data set representing existing information in a computer readable database, wherein the input customer data record contains a data field representing an identifier, and members of the synonym set are first identifier values referring to respective second identifier values, the second identifier values being predetermined identifier values in the reference data set, the method of updating the synonym set when checking the input customer data record against the reference data set comprising the steps of:

determining among the predetermined identifier values in the reference data set at least one synonym candidate relating to the value of the data field in the input customer data record using a candidate selection criterion, determining if the value of the data field and a synonym candidate of the at least one synonym candidate fulfill a predetermined synonym acceptance criterion based on at least one quality parameter, wherein said at least one quality parameter takes into account writing variations that are evaluated based on differences in the value of the data field and the synonym candidate, and when the predetermined synonym acceptance criterion is fulfilled, automatically adding the value of the data field to the synonym set as a member referring to the accepted synonym candidate in the reference data set without intervention of a user and before the synonym set is used in the checking of the input customer data record against the reference data set by searching for a counterpart for the input customer data record from the synonym set.

24. A data processing system comprising a processor for tolerating writing variations in input data when checking input customer information against existing information, the system comprising:

means for receiving a customer data record, memory means for storing a reference data set comprising predetermined identifier values, means for determining in the data record a value of a data field, the data field representing an identifier, means for associating the values of the data field and a respective predetermined identifier value as synonyms, said means configured to determine from the predetermined identifier values in the reference data set at least one synonym candidate for the value of the data field, to determine if a synonym candidate of the determined at least one synonym candidate and the value of the data field fulfill a predetermined synonym acceptance criterion based on at least one quality parameter, wherein said at least one quality parameter takes into account writing variations that are evaluated based on differences in the value of the data field and the synonym candidate, and when the predetermined synonym acceptance criterion is fulfilled, to associate the value of the data field and the synonym candidate as synonyms and to automatically add the value of the data field to a synonym set representing known writing variations for the identifier and referencing to respective entries in the reference data set as a member referring to the accepted synonym candidate in the reference data set without intervention of a user to provide an updated synonym set before searching for a counterpart for the input customer data record, and means for checking the input customer data record by searching for a counterpart for the customer input date record in the reference data set by comparing the value of the data field to the updated synonyms set.

25. A data processing system comprising a processor configured to update a synonym set stored in a computer readable database to tolerate writing variation in input data when the synonym set is used in checking an input customer information against a reference data set representing existing information in a computer readable database, wherein an input customer data record contains a data field representing an identifier, and members of the synonym set are first identifier values referring to respective second identifier values, said second identifier values being predetermined identifier values in the reference data set, the system comprising:

memory means for storing the synonym set, means for storing the reference data set comprising predetermined identifier values, means for receiving a customer data records, means for determining in the data records a value of the data field, and updating means configured to determine from the predetermined identifier values in the reference data set at least one synonym candidate for the value of the data field, to determine if a synonym candidate and the value of the data field fulfill a predetermined synonym acceptance criterion based on at least one quality parameter, said at least one quality parameter taking into account writing variations that are evaluated based on differences in the value of the data field and the synonym candidate, and when the predetermined synonym acceptance criterion is fulfilled, to automatically add the value of the data field to the synonym set as a member referring to the accepted synonym candidate in the reference data set without intervention of a user and before the synonym set is used in checking of the customer data record against the reference data set by searching for a counterpart for the customer data record from the synonym set.

26. A data processing apparatus, comprising:

at least one processor configured to tolerate writing variations in input data when checking an input customer data record information against a reference data set comprising predetermined identifier values, to determine in the input customer data record a value of a data field, the data field representing an identifier, to associate the value of the data field and respective predetermined identifier values as synonyms, to determine from the predetermined identifier values at least one synonym candidate for the value of the data field, to determine if a synonym candidate of the determined at least one synonym candidate and the value of the data field fulfill a predetermined synonym acceptance criterion based on at least one quality parameter, wherein said at least one quality parameter takes into account writing variations that are evaluated based on differences in the value of the data field and the synonym candidate, and when the predetermined synonym acceptance criterion is fulfilled, to associate the value of the data field and the synonym candidate as synonyms and to automatically add the value of the data field to a synonym set representing known writing variations for the identifier and referencing to respective entries in the reference data set to provide an updated synonym set as a member referring to the accepted synonym candidate in the reference data set without intervention of a user before searching for a counterpart for the input customer data record, to store the updated synonym set, and to check the input customer data record by searching for a counterpart for the input customer data record in the reference data set by comparing the value of the data field to the updated synonym set.

27. A data processing apparatus comprising:

a processor configured to update a synonym set stored in a computer readable database to tolerate writing variations in input data when the synonym set is used in checking an input customer information against a reference data set representing existing information in a computer readable database, wherein the processor is configured to cause the update by determining from predetermined identifier values in the reference data set at least one synonym candidate for a value of a data field of an input customer data record, determining if a synonym candidate of the at least one synonym candidate and the value of the data field fulfill a predetermined synonym acceptance criterion based on at least one quality parameter, wherein said at least one quality parameter takes into account writing variations that are evaluated based on differences in the value of the data field and the synonym candidate, and when the predetermined synonym acceptance criterion is fulfilled, automatically add the value of the data field to the synonym set as a member referring to the accepted synonym candidate in the reference data set without intervention of a user and before the synonym set is used in checking of the customer data record against the reference data set by searching for a counterpart for the customer data record from the synonym set.

* * * * *